(12) United States Patent
Bellussi

(10) Patent No.: US 7,857,980 B2
(45) Date of Patent: Dec. 28, 2010

(54) PLANT FOR FILTERING SUBSTANCES

(75) Inventor: Antoni Paolo Bellussi, Conegliamo (IT)

(73) Assignee: Antoni Bellussi di Bared, Conegliano (TV) (IT)

( * ) Notice: Subject to any disclaimer, the term of this patent is extended or adjusted under 35 U.S.C. 154(b) by 610 days.

(21) Appl. No.: 11/890,429

(22) Filed: Aug. 6, 2007

(65) Prior Publication Data
US 2008/0041793 A1 Feb. 21, 2008

(30) Foreign Application Priority Data
Aug. 7, 2006 (IT) ............................... PN06A0061

(51) Int. Cl.
*B01D 29/66* (2006.01)
(52) U.S. Cl. ..................... 210/742; 210/798; 210/137; 210/141; 210/323.2; 210/333.01; 210/321.89; 210/321.69
(58) Field of Classification Search .............. 210/742, 210/798, 137, 141, 323.2, 333.01, 321.69, 210/321.89
See application file for complete search history.

(56) References Cited

U.S. PATENT DOCUMENTS 7,404,926 B2 * 7/2008 Rhoades ...................... 422/62

FOREIGN PATENT DOCUMENTS

IT    PN 2004 A 000053    10/2004

* cited by examiner

*Primary Examiner*—Terry K Cecil
(74) *Attorney, Agent, or Firm*—Bucknam and Archer

(57) ABSTRACT

Plant for filtering substances to be cleaned of various kinds of semi-solid or liquid polluting substances, constituted by filtering devices (5) connected to each other, including a first circulation circuit of the substances to be cleaned introduced into each filtering device (5) for discharging the polluting substances after having been cleaned; a second circulation circuit of the cleaned liquids and the exit from the plant, and the possible collection into suitable containers; a third circulation circuit of suitable plant washing liquids, so as to clean the various plant component parts of the polluting substances remaining after one or more working cycles. The plant being arranged to set pre-established operative programs, such as to determine a working cycle composed by a first rest step, a second filling step, a third filtering step, a fourth emptying step, a fifth discharge step, a sixth rinsing step and a seventh washing step.

5 Claims, 12 Drawing Sheets

PLANT FOR FILTERING SUBSTANCES

The invention relates to a plant for filtering substances to be cleaned of various kind, particularly but not exclusively muds and other semi-solid or liquid dirty and polluting substances as well as liquid foods such as for instance wine, milk, oil, etc. and also relates to a working cycle for filtering such substances.

Filtering devices for filtering and cleaning muds and dirty and polluting substances of various kind are known, and can be assembled on to suitable plants for treatment of muds and substances to be cleaned of various kind. In particular, from the Italian patent application n. PN2004A000053, filed on Jul. 30, 2004 by the same Applicant a filtering device is known, which comprises an inlet conduit for pumping substances to be cleaned, a discharge conduit to discharge the dirty and polluting substances, and a plurality of capillary tubes with permeable walls arranged approached and separated to each other and communicating with said inlet and discharge conduits, in order to separate the cleaned liquids being discharged outside through outlet conduits.

This filtering device is characterized by a lengthened cylindrical envelope, delimiting an inner room communicating with said outlet conduits and said inlet and discharge conduits, and adapted to house at least a separate, removable and interchangeable filtering cartridge, to filter the dirty and polluting substances, said lengthened envelope being joined at its end portions respectively with a first and a second closing element, identical to each other, and shaped respectively like said inlet and discharge conduits. For better understanding the constructive features of the filtering device referred to, reference is made to the specification and claims of the above patent application.

The present invention relates to a plant for filtering substances to be cleaned of various kind, composed of a plurality of filtering devices identical to those described into said patent application, and also provided with regulating means for the inner pressure of the same plant, which are of a kind different than those employed hitherto in the currently existing filtering plants, which consist of electric, pneumatic or the like actuators connected into specific circuits provided in the same plants, which actuators are controlled by transducers or sensors of various kind to be moved into different regulating positions, so as to keep the inner pressure within pre-established safety limits, under the different plant operative conditions.

Besides of requiring the presence of these circuits, such electric actuators are operated with relatively long response times, which do not allow to regulate effectively the pressure in an almost instantaneous manner, as it would be on the contrary required under different operative conditions of the same plant, which are determined above all by the progressive clogging of the filtering devices and flowing conduits with the cleaned polluting substances, and under these circumstances undesired damages of the capillaries of the filtering devices might occur.

The present invention also relates to a fully automatic or manual operative working cycle for filtering the substances to be cleaned into this filtering plant.

The filtering plant referred to, thanks to the use of such pressure regulating means of different kind, allows to eliminate completely the use of the above mentioned electric actuators and thereby to avoid also the drawbacks related thereto. The features of this filtering plant and the composition of the working cycle thereof are realized in the manner resulting from the attached claims of the present patent.

The invention will be understood better from the following description, given by way of not limitative example only, and with reference to the accompanying drawings wherein.

Figure 1:
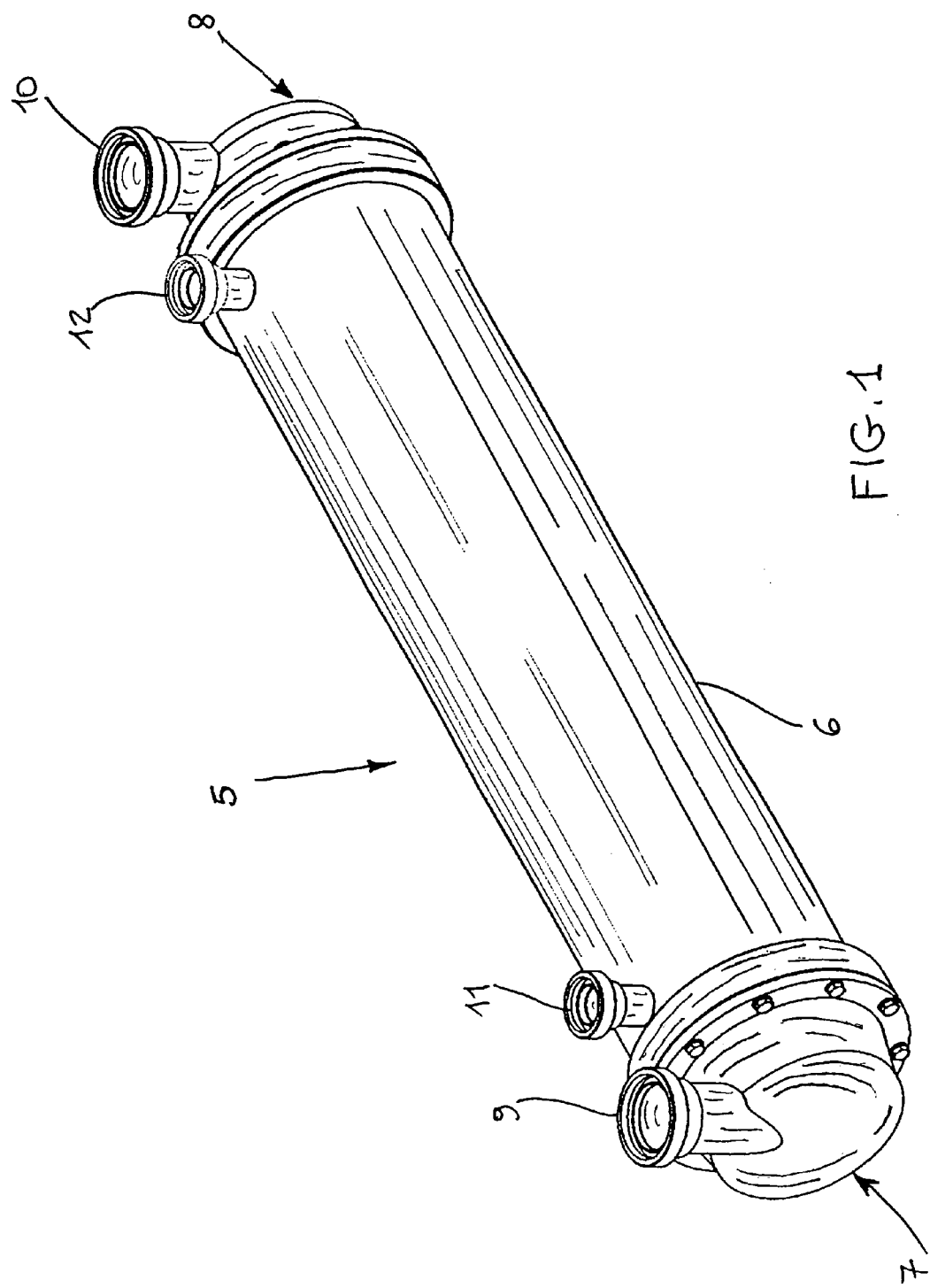
FIG. 1 shows a perspective front view of a filtering device mounted in the filtering plant according to the invention.
Figure 2:
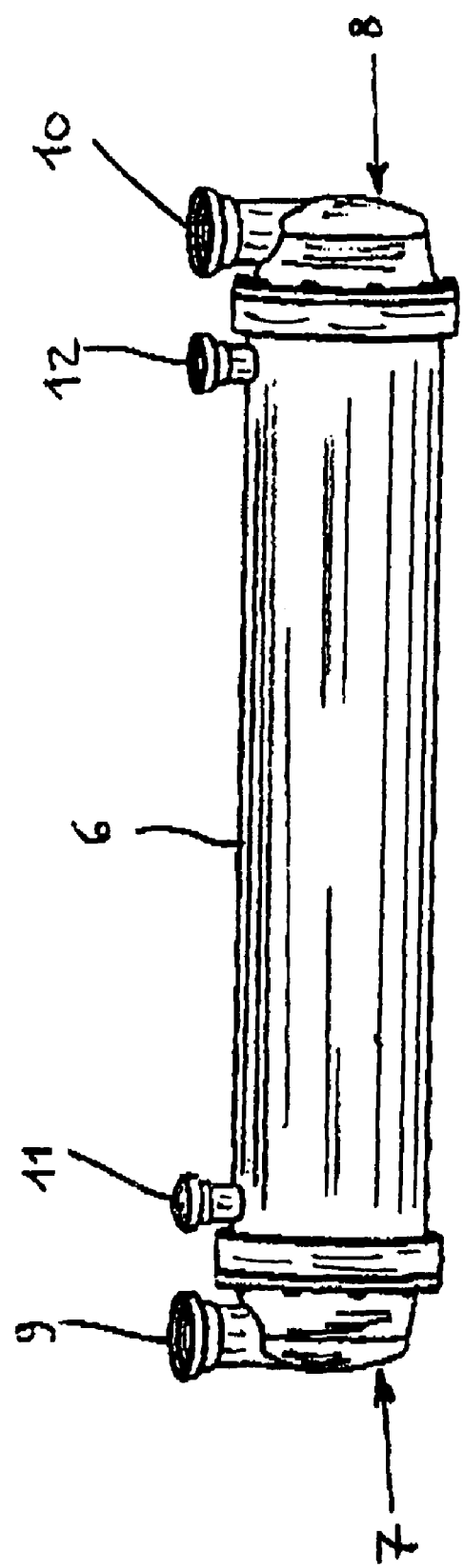
FIG. 2 shows a front view of the filtering device of FIG. 1.

The present invention relates to a plant for filtering substances to be cleaned of various kind, particularly but not exclusively muds and other semi-solid or liquid dirty and polluting substances, as well as liquid foods such as for instance wine, milk, oil, etc., and also relates to a working cycle for filtering such substances, this plant being constituted by a plurality of filtering devices 5 for filtering the substances referred to, which are made with the constructive features described in the patent application for invention n. PN2004A000053, filed on Jul. 30, 2004 by the same Applicant, and each one of which is visible with particular reference to FIGS. 1-4, and is constituted substantially by a lengthened cylindrical envelope 6, the end portions of which are joined respectively to a first and a second closing element 7 and 8, identical to each other, shaped respectively with an inlet conduit 9, through which the dirty and polluting substances to be cleaned (such as for example the muds) are pumped, and a discharge conduit 10 joined to suitable containers (not shown), through which the dirty and polluting substances are conveyed.

Figure 3:
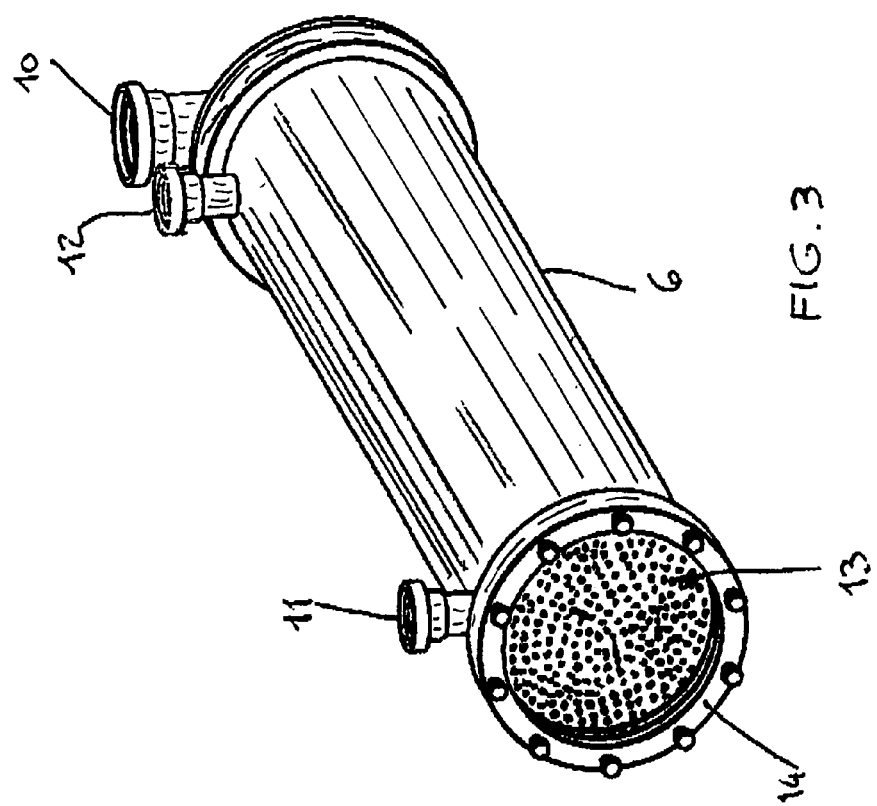
FIG. 3 shows a perspective side view of the filtering device of FIG. 1, on a first embodiment thereof.
Figure 4:
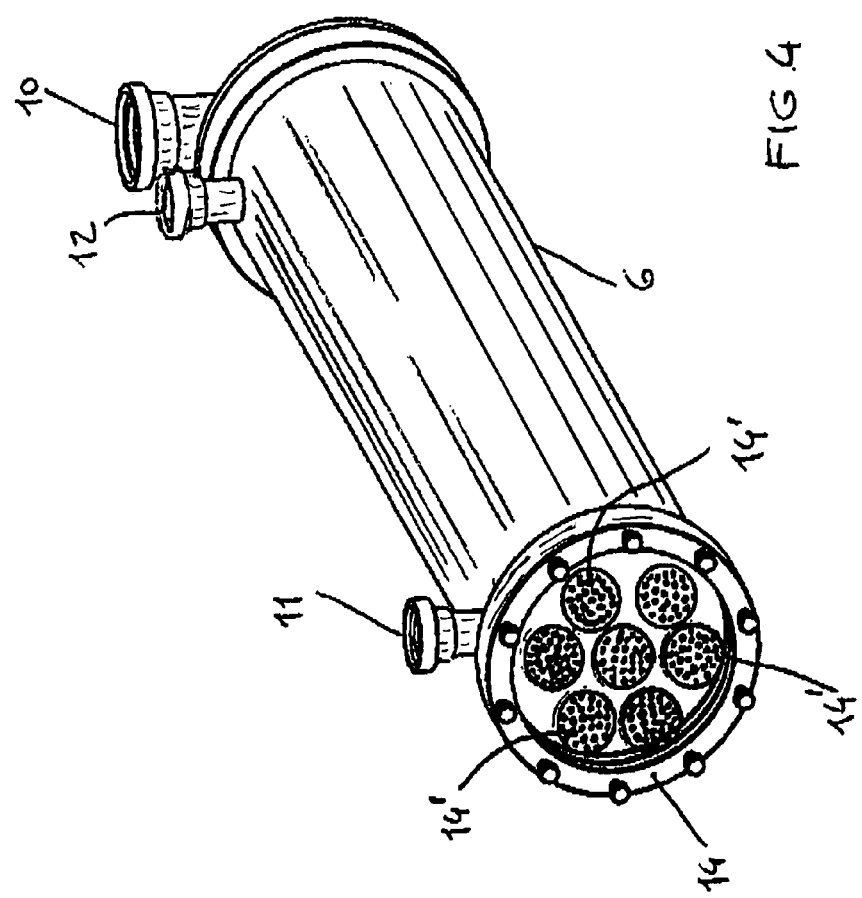
FIG. 4 shows a perspective side view of the filtering device of FIG. 1, on a second embodiment thereof.
Figure 5:
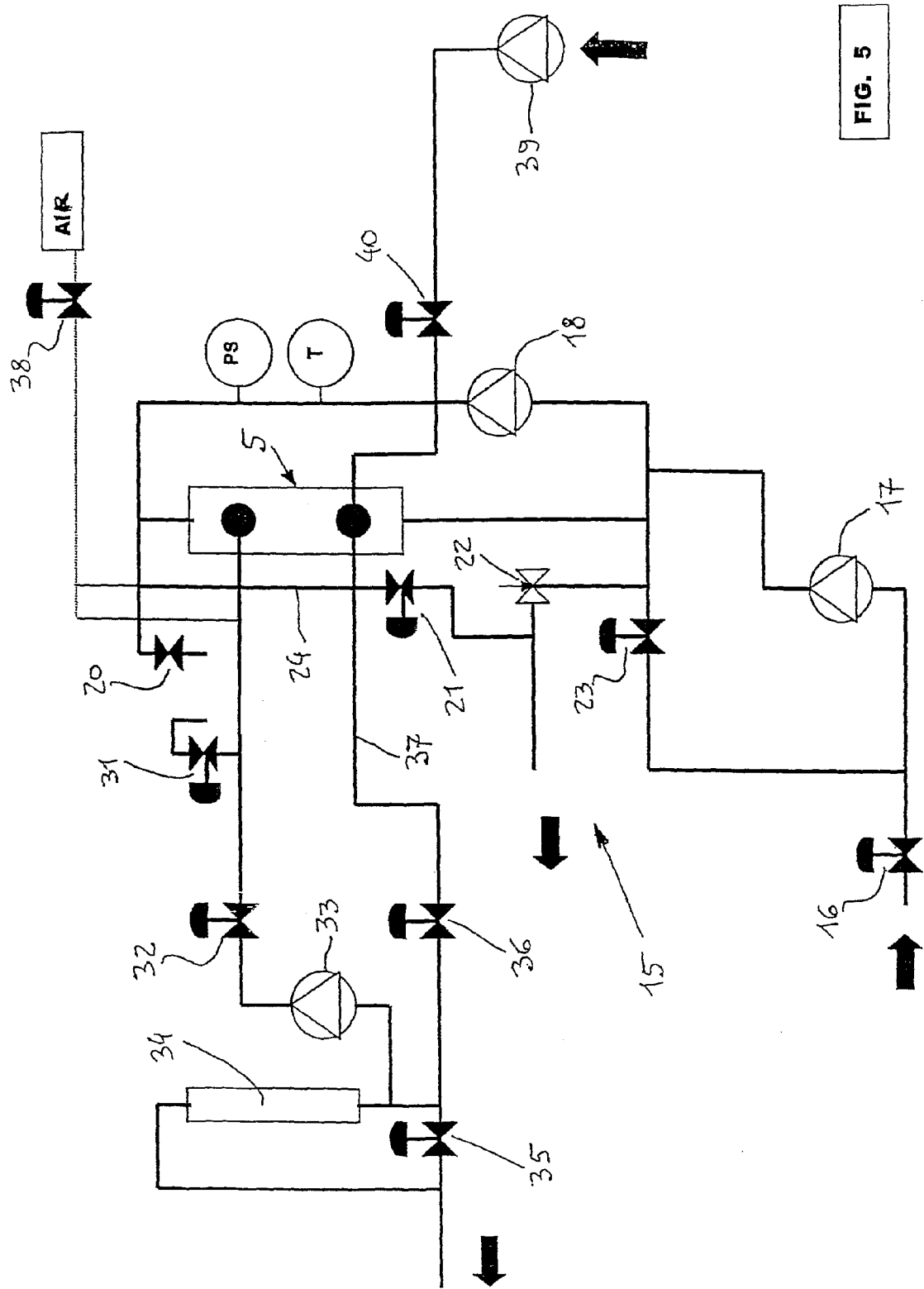
FIG. 5 shows the circuit diagram of the filtering plant according to the invention.

In turn, the cylindrical envelope 6 is internally hollow, by delimiting an inner room (not shown) in which the dirty and polluting substances are filtered, and is joined to outlet conduits, in the example represented by the two conduits 11 and 12, through which the collected cleaned liquids are discharged outside. A separate, removable and interchangeable filtering cartridge 13, see FIG. 3, is provided for filtering the dirty and polluting material and is shaped with internally hollow lengthened cylindrical form, with such sizes as to be adapted into the inner room of the cylindrical envelope 6, and housing internally for the entire extent thereof a plurality of capillary tubes (not shown), having permeable walls and reduced size, and the same length, which are arranged approached and separated to each other, the respective end portions of which are included into corresponding sealing discs (of which the disc 14 only is visible), made of polyurethanic resin or the like. For fully understanding all the other constructive features of each filtering device 5, which on this context aren't described in that they aren't needed, reference is made to the specification and claims of the previous patent application. Instead of being provided with a single filtering cartridge, as described above, each filtering device used in the present filtering plant may contain also a plurality of filtering cartridges 14' identical to each other, visible from FIG. 4, which are shaped like the above filtering cartridge 13, and are disposed approached and separated to each other, in a parallel and/or series arrangement. Turning now to FIG. 5, in which the circuit diagram of the filtering plant 15 according to the invention is shown, it is noted that this filtering plant is constituted substantially by three distinct liquid circulation circuits, provided respectively for the circulation of the semi-solid or liquid substances to be cleaned introduced into each filtering device 5, and for discharging the dirty and polluting substances after having been cleaned, for the circulation of the cleaned liquids and the exit from the plant thereof for being collected into suitable containers, and for the circulation of adequate plant washing liquids when plant does not operate, in order to clean the various plant component parts from the dirty and polluting substances remained after many working cycles.

As it is visible particularly from such Figure, into the circulation circuit of the substances to be cleaned, there are connected various components formed substantially by a supply valve 16 for the introduction of the substances to be cleaned, a supply pump 17 for pumping the substances to be cleaned through the different circuit conduits, a circulation pump 18 for circulating the substances to be cleaned through the different filtering devices provided therein, the filtering devices 5 in the example formed by a filtering device 5, a manual operated vent valve 20 for discharging air contained into the different circulation conduits during the plant emptying step, a service valve 21 for exiting the dirty and polluting substances when required during the cycle, a pressure regulating valve 22 to adjust automatically the circuit inner pressure during each working cycle, by keeping it within such pre-established limits as not to jeopardize the plant operative safety, and a discharge valve 23 for the separated dirty and polluting substances, for discharging them at the end of each working cycle. In particular, the vent valve 20 and service valve 21 are connected to a secondary branch 24 of the circulation circuit of the substances to be cleaned, in parallel to the main branch of the same circuit, where the filtering devices 5 and the related pumps 17 and 18 are connected, and these valves remain closed during the steps of each plant working cycle in which cleaning operation occurs and are opened when the plant emptying operation is needed, while the pressure regulation valve 22 is also connected to said circuit secondary branch 24.

Figure 6:
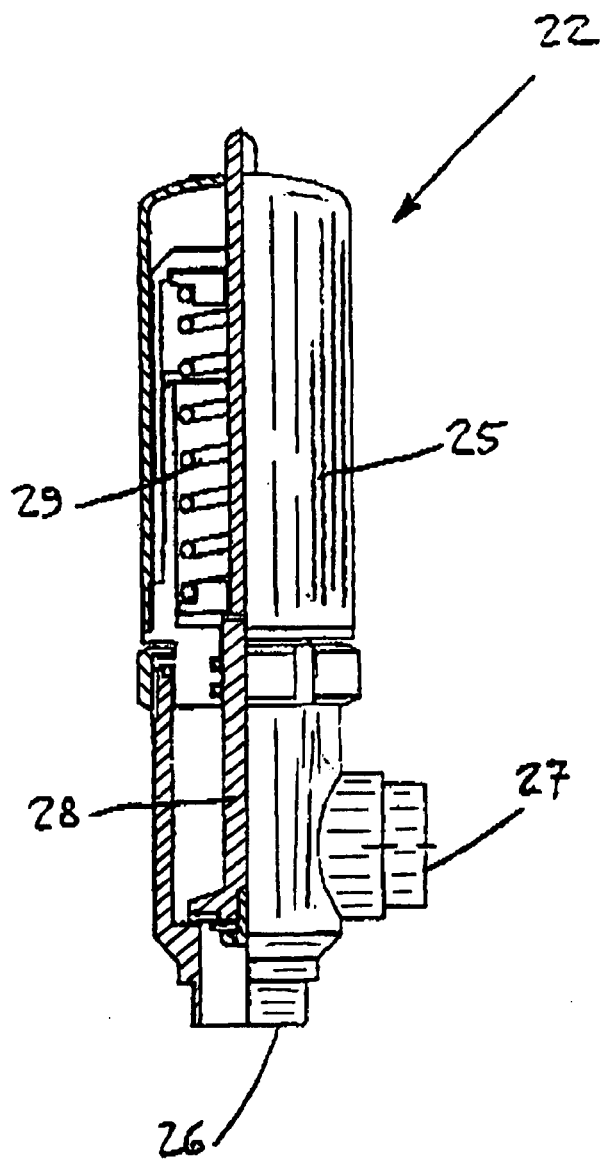
FIG. 6 shows a partially cutaway front view of a component part of the filtering plant according to the invention.

Moreover, such pressure regulating valve 22 according to the invention is made in the form of a classic mechanical spring valve, see FIG. 6, constituted by an outer housing 25 provided with an inlet conduit 26 and an outlet conduit 27 and housing an inner valve member 28 and a spring 29, urging such valve member 28 to close the mouthpiece of the inlet conduit 26. In this way, the pressure of the circulating liquid entering the inlet conduit 26 of the regulating valve 22 causes the valve member 28 to be lifted, against the action of the spring 29, thereby permitting the liquid to pass through the outlet conduit 27. The valve so acts as a flow proportional regulation valve, and under this condition it allows to change automatically the liquid passage section depending on the pressure of the circulating liquid, thereby balancing automatically, thanks to the specific calibration of the spring 29, any pressure increase of the liquid circulating through the cleaning plant and therefore keeping such pressure within the pre-established limits for the plant safety.

Thanks to the presence of this mechanically actuated valve, permitting to eliminate the electric actuators provided hitherto in the current existing cleaning plants, there are achieved the important advantages to clean more effectively the circulation conduits, to eliminate almost completely any possible damage of the capillaries of the filtering devices during the counterflow circulation through them of the used washing liquids, and to effect regulations exactly proportional to the liquid flow, depending on the pressure of the circulating liquid, with immediate response times, which further diminish any possible damage of the circulation conduits in the cases of sudden increases of the pressure of the circulating liquid.

In turn, the circulation circuit of the cleaned liquids is also composed of various components, connected to a branch 30 of the same circuit and formed substantially by an automatic controlled air venting cock 31, adapted to vent the plant conduits and to draw some samples of the filtered liquid, to inspect the cleaning degree of this liquid, an intercepting valve 32 for the filtered liquid and a circulation pump 33 for counterflow circulating the filtered liquid on determinate moments of the cycle, which liquid is collected into suitable collecting reservoirs 34, in order to wash the filtering devices and remove the liquid particles being hold by the same filtering devices, and also formed by a discharge valve 35 of the filtered liquid contained into the collecting reservoirs, which is provided for effecting such counterflow washings, and a discharge valve 36 connected to another circuit branch 37, parallel to the previous branch, and provided for discharging outside the filtered liquid at the end of the working cycle.

Finally, the washing circuit is also composed of various components, formed by a washing water supply pump 39, which water is introduced into the circuit alone or mixed with suitable washing and/or disinfectant liquids, and a manually or automatically operated cock 40, which is operated together with the pump 39 on determinate moments of the cycle.

Figure 7:
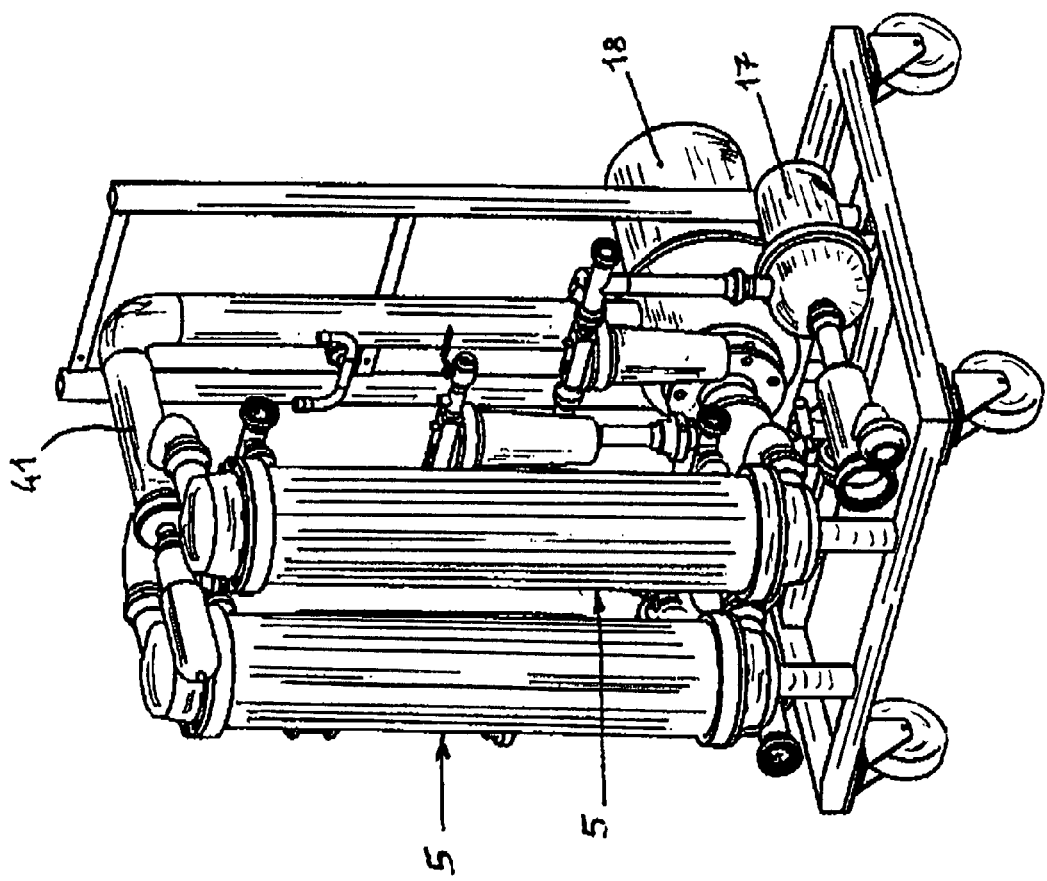
FIG. 7 shows a perspective front view of a filtering plant according to the invention, constituted by two filtering devices.
Figure 8:
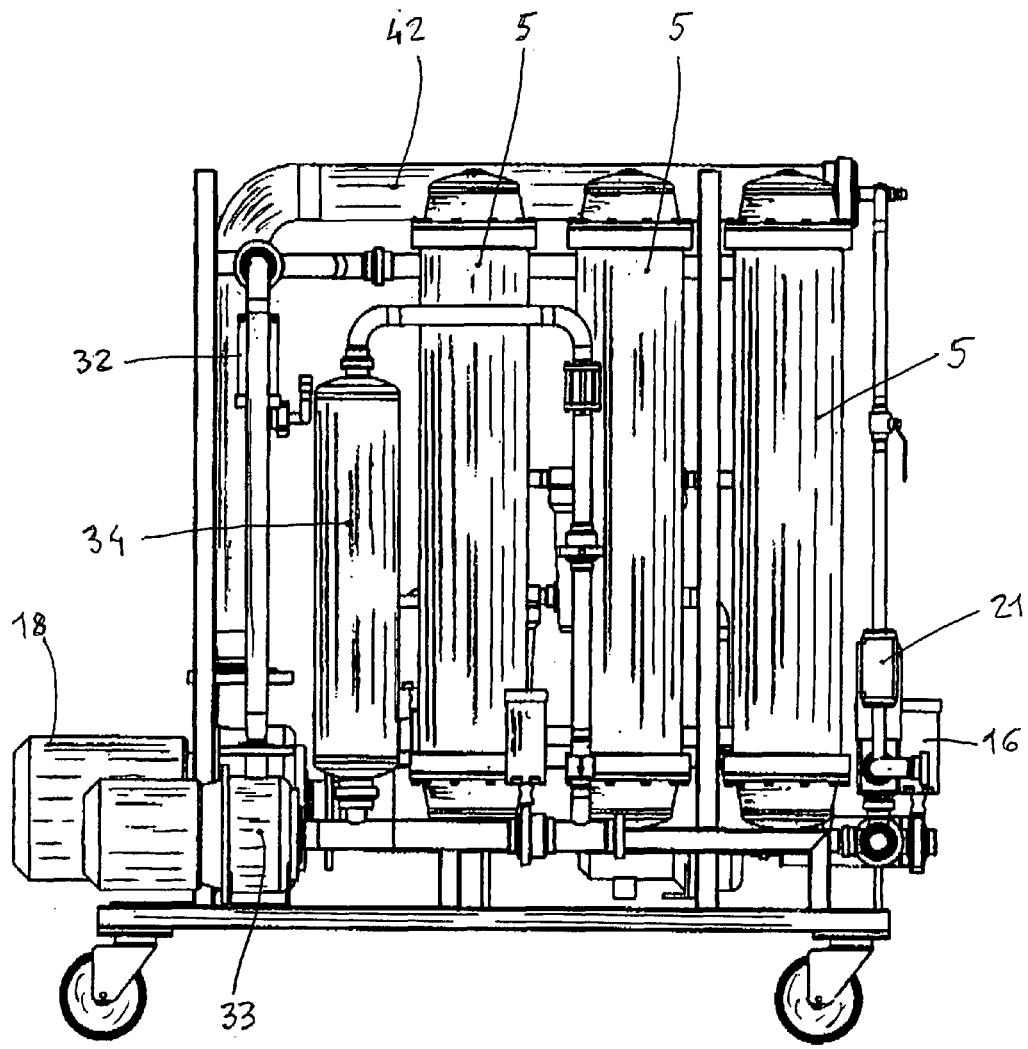
FIG. 8 shows a front view of a filtering plant according to the invention, constituted by three filtering devices.
Figure 9:
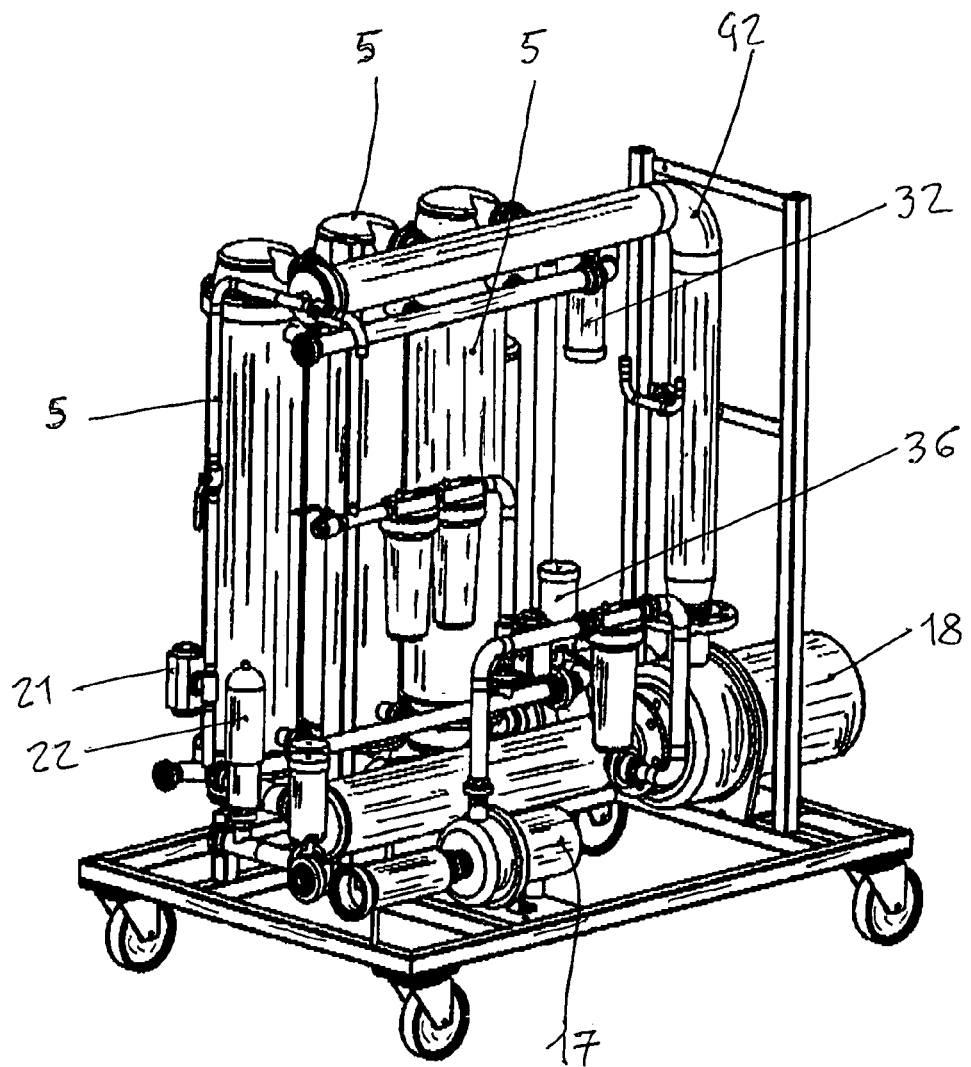
FIG. 9 shows a perspective back view of the filtering plant of FIG. 8.
Figure 10:
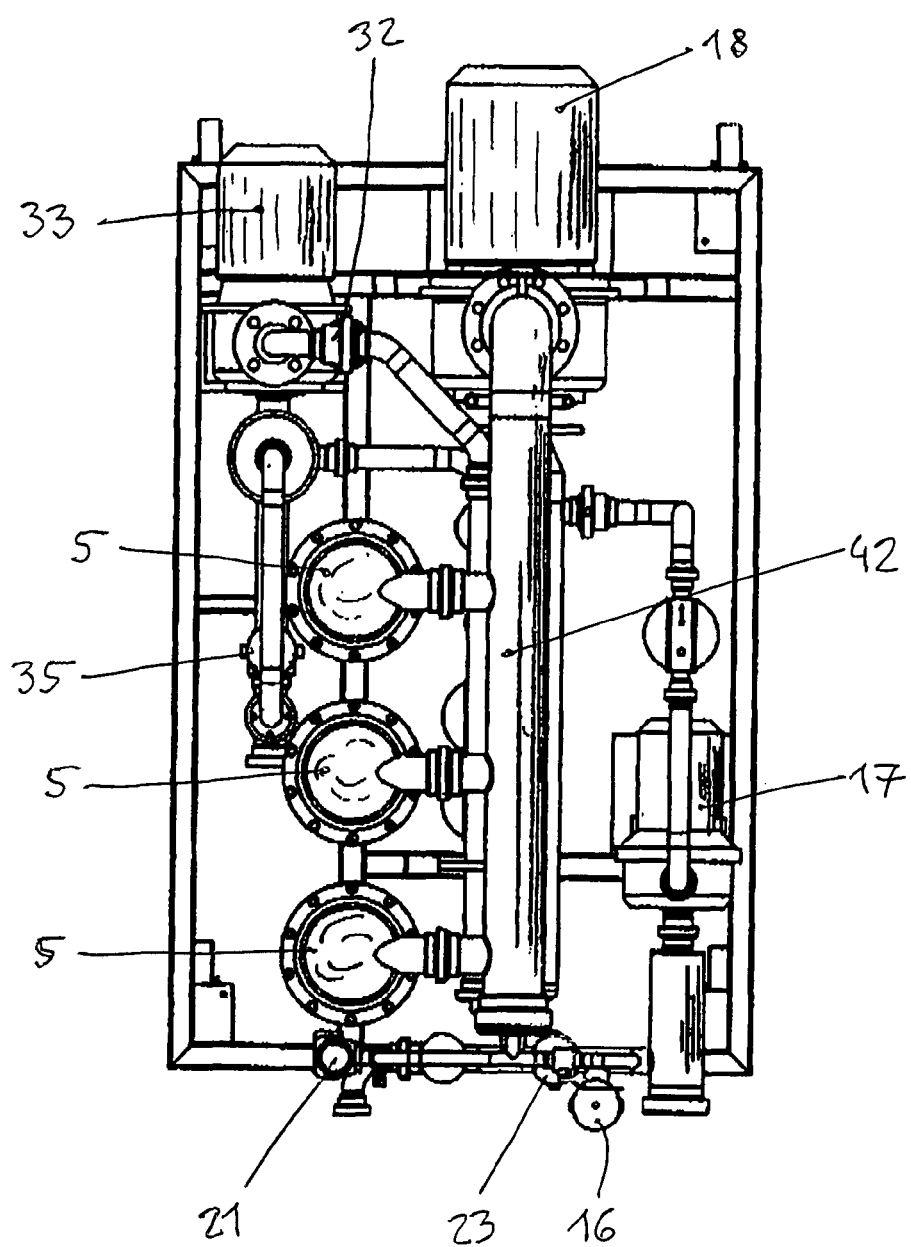
FIG. 10 shows a plan view of the filtering plant of FIG. 9.
Figure 11:
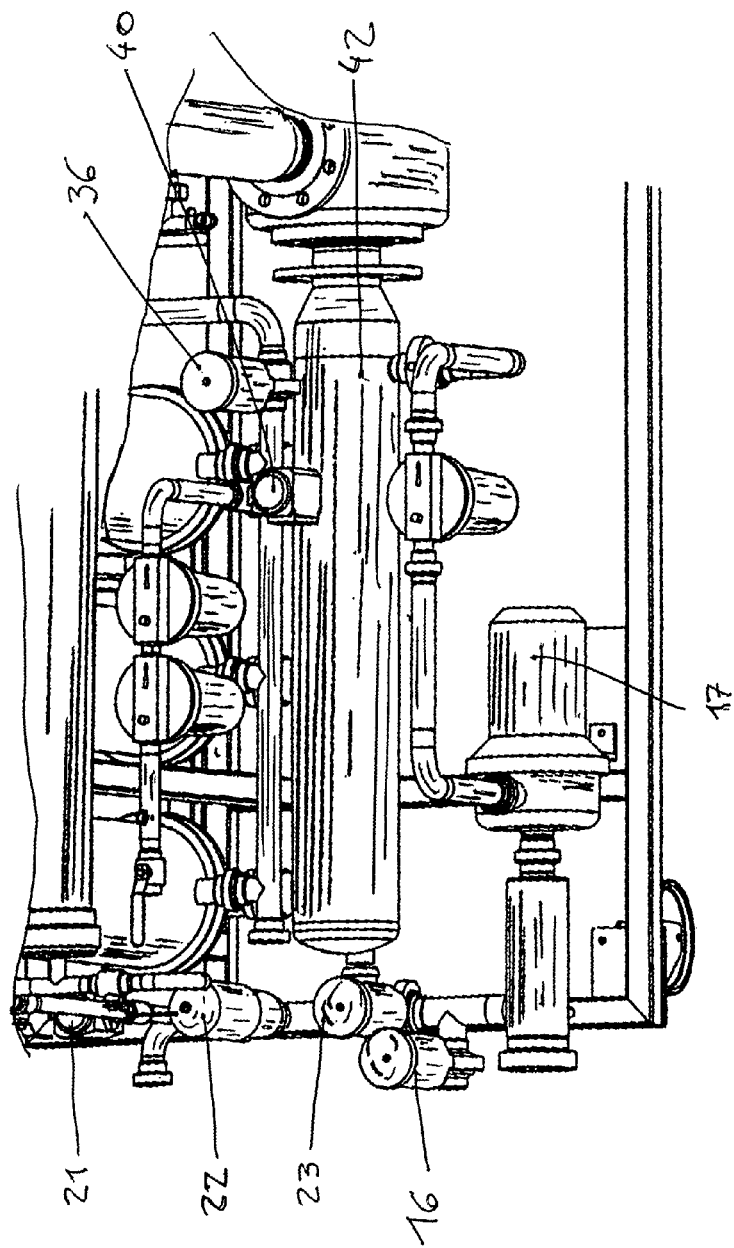
FIG. 11 shows a perspective back and enlarged view of an item of the filtering plant of FIG. 9.

FIGS. 7-12 show now the filtering plants according to the invention, with different arrangements of their various component parts, which are marked with the same reference numerals. In particular, FIG. 7 shows a filtering plant composed of two filtering devices 5, joined together and to the plant through two common collectors 41, while FIGS. 8-11 show a filtering plant composed of three filtering devices 5, joined together and to the plant through a common collector 42.

Figure 12:
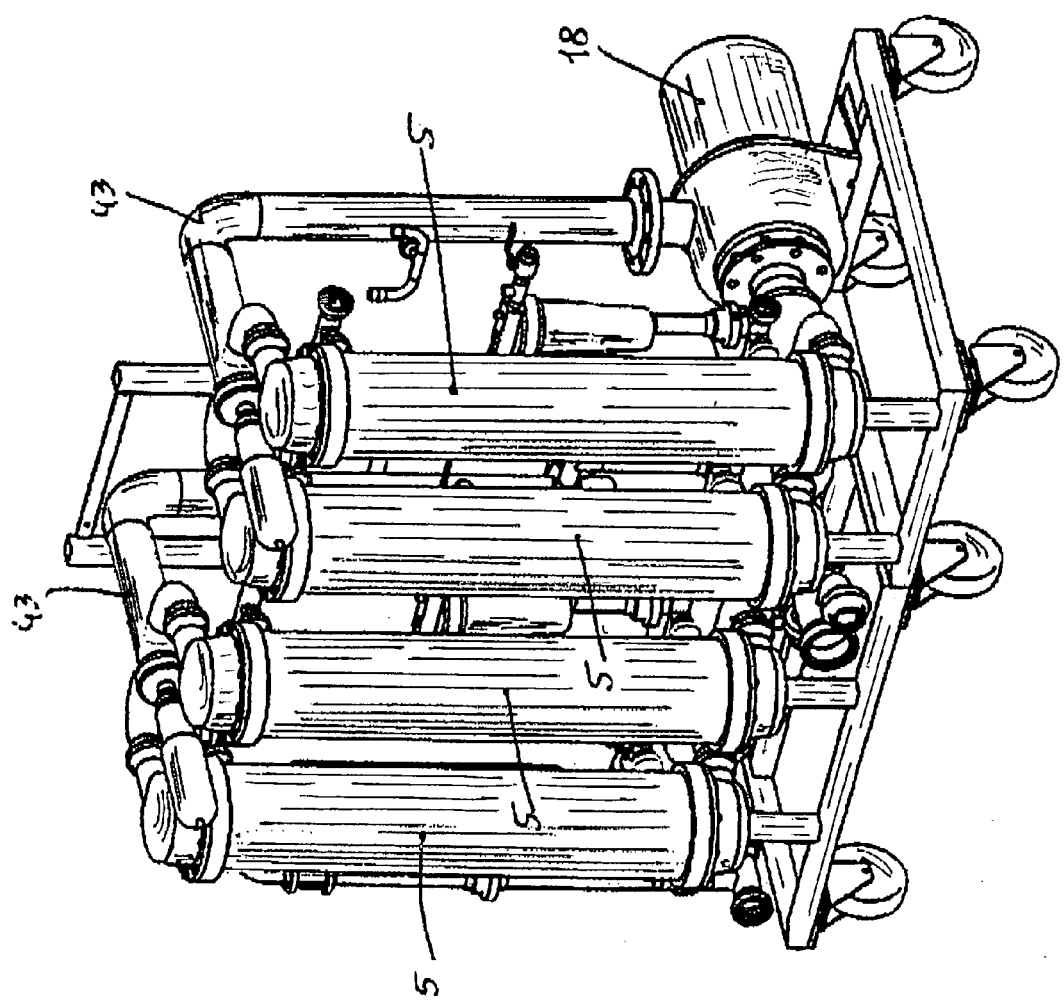
FIG. 12 shows a perspective front view of the filtering plant according to the invention, constituted by four filtering devices.

Finally, FIG. 12 shows a filtering plant composed of four filtering devices 5, joined together and to the plant through two common collectors 43.

A working cycle performed in the filtering plant according to the invention is hereinafter described, which cycle comprises substantially the following steps:

1) rest step;
2) filling step;
3) filtering step;
4) emptying step;
5) complete discharge step;
6) rinsing step;
7) washing step.

All these steps are controlled through an electronic control device, connected to the plant electric circuit, in accordance to one or more operative programs which are set in advance in the same device.

1) In the starting rest step of the plant referred to, the following components are closed namely inactive: 16, 40, 38, 31, 32, 35, 36, 21, 23, and also the pumps 17, 18, 39 and 33.

Under these conditions, the plant does not operate and is set for starting a working cycle.

2) In the filling step, the operator provides for operating the start of a working cycle, by acting on to the start push-button (not indicated) connected to the plant electric circuit, together with the electric actuators of the different plant components, and under this condition the components 40, 38, 32, 35, 36 and 23 remain always closed namely inactive, while the components 16, 31 and 21 are opened namely activated, in which circumstance the plant is set for the introduction of the dirty and polluting substances to be cleaned therein (due to the opening of the supply valve 16), while air contained into the circulation circuit of the cleaned liquids is discharged outside (through the vent cock 31). This step is ended by the operator by acting on to the stop push-button (not shown), also connected to the plant electric circuit, or it is ended automatically after a pre-established time interval.

3) In the subsequent filtering step, the plant heating temperature is controlled during the circulation of the dirty and polluting substances to be cleaned, through adequate temperature sensors installed in the plant, which temperature does not exceed pre-established limits so as not to damage the same plant. Then, the operator provides for actuating the start push-button, thereby starting this filtering step. Under these conditions, the components 40, 38, 32, 35, 36 and 23 remain still closed namely inactive, and also the component 31 is closed namely inactivated. In turn, the components 16 and 21 remain still opened namely activated, while the pumps 17 and 18 are opened namely activated too, so that in the circulation circuit of the substances to be cleaned there are circulated the same substances, thereafter after a limited time (of about 60 sec. max.) the component 21 is again closed namely inactivated, thereby preventing the circulating substances to be cleaned from exiting through this component. Afterwards, the component 32 is opened namely activated for a limited time and then it is closed namely inactivated again, and this operative sequence is repeated more times, in the present example three times. Finally, such component 32 is still kept opened namely activated for a limited time (of about 60 sec. max.), then a counterflow washing cycle through the circulation circuit of the substances to be cleaned is started, by opening namely activating the pump 33 and the component 35, with consequent cleaning of the filtering devices 5 and removal of the dirty and polluting substances held by the same devices.

This step is ended by operating the stop manually or automatically, through the plant control device, based on the operative program which has been set.

The circuit temperature and pressure are controlled automatically by the relative sensors and, in the case in which the pre-established limit values are exceeded, the correspondent alarm systems are activated, by signaling these conditions to the operator.

4) In the emptying step, which is performed after a certain number of working cycles and/or in the case in which the not cleaned liquids drawn through the service valve 21 have excessive levels of concentration of polluting substances (inspected through the service valve 21), this step is started by the operator by actuating the start push-button, and under this condition the components 40, 31 and 32 remain still closed namely inactivated, and also the component 21 is closed namely inactivated, while the components 16, 35, 36 and 23 and a valve 38 supplying compressed air are opened namely activated. Under these circumstances, compressed air is introduced through the conduits of the circulation circuit of the substances to be cleaned and the cleaned substances, with consequent emptying of the same conduits. The pressure of the compressed air circulating through these conduits is kept within such pre-established limits as not to jeopardize the plant referred to, with successive on and off conditions of the air valve 38 for limited times.

Then, after a pre-established time set into the operative program, this emptying step automatically is stopped.

5) In the subsequent complete discharge step, it is performed the complete discharge by gravity, without compressed air, of both the circulation circuit of the substances to be cleaned and the circulation circuit of the cleaned liquids, and such step is started by the operator by actuating the start push-button, in which circumstance the component 40 is kept still closed namely inactive, while also the component 38 is kept closed namely inactive, and in which the components 16, 31, 32, 35, 36, 21 and 23 are kept still opened namely activated. This step is ended by the operator by actuating the stop push-button, or it is ended automatically by the plant control device, after a pre-established time set in the operative program.

6) In the subsequent rinsing step, through the conduits of the circulation circuit of the substances to be cleaned and the circulation circuit of the cleaned liquids there is circulated water mixed with suitable detergent and/or disinfectant substances. This step is started by the operator by pushing the start push-button, under the condition in which the component 38 is kept still closed namely inactivated, and also the component 31 is actuated in the closed namely inactivated position, while the components 16, 35, 36 and 23 are kept still opened namely activated, and also the components 40, 32 and 21 are opened namely activated, as well as the pump 39 is opened namely activated, and the pressure of the rinsing liquid circulating through the washing circuit is kept within a pre-established level, so as to avoid any damage to this circuit, thanks to a succession of on and off conditions of both the pump 39 and the cock 40. Consequently, the circulation circuit of the cleaned liquids is rinsed. After a pre-established activation time of the pump 39, in the present example of 60 sec. max, the components 35 and 36 are closed namely inactivated, then by keeping still activated the pump 39 there are effected some rinsing cycles for a pre-established time, in the example of 120 sec. max, and between one rinsing and the next one the component 23 at first and thereafter the component 16 are closed namely inactivated.

Subsequently, the pump 18 is switched on and off various times, in the present example three times, by stopping it when these steps are ended, with consequent rinsing of the circuit of the substances to be cleaned. Afterwards, the components 16 and 23 are firstly opened namely activated and, after a pre-established time, in the present example of 120 sec. max, are closed namely inactivated again, and after a pre-established time there are at first closed namely inactivated the components 40, 32 and 21 and the pump 39, and finally the step is automatically ended.

7) In the subsequent washing step, it is checked the plant heating temperature during the circulation of water mixed with suitable detergent and/or disinfectant substances, and this check is effected through adequate temperature sensors installed in the plant, which temperature mustn't exceed pre-established limits in order not to damage the same plant.

Thereafter, the operator provides for actuating the start push-button, thereby starting this washing step. Under these conditions, the components 38, 31, 35, 36 and 23 are closed namely inactive, while the components 16, 40, 32 and 21 as well as the pump 39 are opened namely activated.

There are effected some washing cycles within pre-established times, and among them there are in succession closed namely inactivated at first the component 16 and afterwards the components 40 and 32 ad the pump 39. Then, after a pre-established time there are opened namely activated the component 16 and the pumps 17 and 18, and after a pre-established time the component 21 is closed namely inactivated, and the component 32 is opened namely activated.

Subsequently, after a pre-established time the component 32 is closed namely inactivated, and the step continues for a time established by the operative program, and when this time is elapsed this step and the working cycle are automatically ended.

Therefore, in this step also the collecting reservoir(s) 34 is (are) washed.

The invention claimed is:

1. Plant for filtering substances to be cleaned of various kinds, particularly but not exclusively muds and other semi-solid or liquid dirty and polluting substances, as well as liquid foods, comprising one or more filtering devices (5) having a lengthened cylindrical envelope (6) with end portions being joined respectively to a first and a second closing element (7, 8) shaped respectively with a first inlet conduit (9), through which the dirty and polluting substances to be cleaned are pumped, and a first outlet or discharge conduit (10) to convey the dirty and polluting substances, said cylindrical envelope (6) being internally hollow and delimiting an inner room in which the dirty and polluting substances are filtered, and being joined to second outlet conduits (11, 12) through which the collected cleaned liquids are discharged outside, said filtering devices (5) also comprising at least a separate, removable and interchangeable filtering cartridge (13), sized as to be positioned into said inner room of said cylindrical envelope (6) and housing internally a plurality of capillary tubes having permeable walls, the respective end portions of said capillary tubes being included in corresponding sealing discs (14) of polyurethane resin, said plant further comprising a first circulation circuit of the substances to be cleaned introduced into each filtering device (5) and for discharging the dirty and polluting substances after having been cleaned, a second circulation circuit of the cleaned liquids and an exit from the plant thereof, for being collected into containers, and a third circulation circuit of a plant washing water, which is introduced in the third circuit alone or mixed with washing and/or disinfection liquids in order to clean various plant component parts from the dirty and polluting substances remaining after one or more working cycles, said first circuit comprising first and second pumping means (17, 18) for circulating the dirty and polluting substances through the first circuit and said filtering device (5), and pressure regulating means (22) adapted to keep the first circuit inner pressure within pre-established levels, compressed air supply means being provided for emptying said first and second circuits, said second circuit comprising third pumping means (33) for the counterflow circulation of the cleaned liquids, in order to clean said filtering devices (5) and at least a collecting reservoir (34) connected in the second circuit, said third circuit comprising fourth pumping means (39) for circulating the washing water, alone or mixed with washing and/or disinfection liquids, through said first, second and third circuits, and an electronic control means being arranged and configured with pre-established operative programs to set a working cycle composed in succession by a first rest step, in which the plant does not operate and is arranged for starting the work cycle; by a second filling step in which the plant is arranged for the introduction through said first circuit of the dirty and polluting substances to be cleaned; by a third filtering step in which the dirty and polluting substances to be cleaned are circulated through said filtering devices (5), in which they are cleaned and the cleaned liquids are circulated through said second circuit; by a fourth emptying step in which said first and second circuit are emptied from the contained substances by means of compressed air; by a fifth discharge step in which there are emptied by gravity the dirty and polluting substances and those cleaned by said first and second circuits; by a sixth rinsing step, with the washing and/or disinfectant liquids, of said first and second circuits; and by a seventh washing step in which a washing cycle is effected with the washing and/or disinfectant liquids of said first and second circuits.

2. Plant according to claim 1, characterized by a plurality of filtering cartridges (14') identical to each other, contained in said filtering devices (5) and disposed in a parallel and/or series arrangement.

3. Plant according to claim 1 or 2, characterized in that said first pumping means comprise a supply pump (17) to pump the substances to be cleaned through the different circuit conduits, and that said second pumping means comprise a circulation pump (18) for circulating the substances to be cleaned through the filtering devices (5), joined to each other and to the plant through respective common collectors (41, 41, 43).

4. Plant according to claim 3, characterized in that said pressure regulating means comprise at least a mechanical spring valve (22), connected to a secondary branch (24) of said first circuit, which is connected in parallel to a main branch of the first circuit, in which said filtering devices (5) and said pumps (17, 18) are connected, said mechanical valve (22) comprising an outer housing (25), provided with a second inlet conduit (26) and an a third outlet conduit (27), and housing an inner valve member (28) and a spring (29), urging said valve member (28) to close said second inlet conduit (26), in a way that the pressure of the circulating liquid entering said second inlet conduit (26) causes said valve member (28) to be lifted automatically, against the action of said spring (29), depending on the pressure of the circulating liquid, thereby balancing automatically, due to the specific calibration of said spring (29), any pressure increase of the circulating liquid.

5. A method for filtering substances to be cleaned of various kinds in a plant according to claim 1 or 2, the method comprising a working cycle including said first step in which said pumping means (17, 28, 39 and 33) are inactive, and the plant does not operate and is arranged for starting the working cycle; said second filling step in which the working cycle is started and the plant is arranged for the introduction of the dirty and polluting substances to be cleaned, while air contained in said first circuit is discharged outside; said third filtering step, effected by checking a plant heating temperature during the circulation of the dirty and polluting substances to be cleaned, and keeping the same temperature within pre-established limits, so as not to damage the plant, this third step occurring by activating initially said first and second pumping means (17, 18) and subsequently also said third pumping means (33), with consequent counterflow washing of said filtering devices (5) and removal of the dirty and polluting substances held in the filtering devices; said fourth emptying step in which compressed air is introduced through said first and second circuits; which are discharged of the liquids contained therein; said fifth discharge step in which the complete discharge is effected by gravity, without compressed air, of said first and second circuits; said sixth rinsing step in which said fourth pumping means (39) is activated at established time intervals, and afterwards also said second pumping means (18) is activated at established time intervals, with consequent rinsing cycle of said first and second circuits with washing and/or disinfectant liquids, and including final inactivation of said fourth and second pumping means (39, 18); and said seventh washing step, including checking the plant heating temperature, and keeping the temperature within pre-established limits so as not to damage the plant, and in which it is effected the washing with the washing and/or disinfectant liquids also of said collecting reservoir (34).

\* \* \* \* \*